Patented Aug. 12, 1947

2,425,334

UNITED STATES PATENT OFFICE 2,425,334

MODIFICATION OF FILAMENTS, ETC., DERIVED FROM SYNTHETIC LINEAR POLYAMIDES

David McCreath, Blackley, Manchester, England, assignor to Imperial Chemical Industries Limited, a corporation of Great Britain No Drawing. Application January 7, 1944, Serial No. 517,470. In Great Britain January 18, 1943

4 Claims. (Cl. 8—115.5)

This invention relates to the modification of filaments, bristles, yarns and the like derived from synthetic linear polyamides (nylons), and more particularly to the modification of such articles by treating them with formaldehyde.

The synthetic linear polyamides are of two general types, namely, those derived from polymerisable monoaminomonocarboxylic acids or their amide-forming derivatives, including lactams, for example polymeric 6-aminocaproic acid, 7-aminoheptanoic acid, 9-aminononanoic acid or 11-aminoundecanoic acid, and those derived from diamines and dicarboxylic acids or amide-forming derivatives of dibasic carboxylic acids, for example polytetramethylene sebacamide, polypentamethylene adipamide, polypentamethylene sebacamide, polyhexamethylene adipamide, polyhexamethylene sebacamide. These polyamides are obtainable according to the methods described in British specifications numbered 461,236, 461,237, 474,999 and 495,790. The polyamides are generally fibre-forming when they have an intrinsic viscosity of 0.4 or more, intrinsic viscosity being defined as $$\frac{\log_e nr}{C}$$

in which $nr$ is the viscosity of a dilute solution (e. g., 0.5% concentration) of the polyamide in meta-cresol divided by the viscosity of meta-cresol in the same units and at the same temperature (e. g., 25° C.) and $C$ is the concentration in grams of polyamide per 100 c. c. of solution. These polyamides can be spun, for example, melt spun, into filaments or bristles which can be cold drawn to as much as four or five times their original length. The filaments can be formed into threads or yarns which can be similarly extended by cold drawing.

It is disclosed in British specification No. 534,698 that filaments, fibres, bristles, films, fabrics, and the like derived from synthetic linear polyamides may be given an increased recovery from deformation and an increased resistance to the degradative action of ultra-violet light by a process which comprises treating them with formaldehyde or a formaldehyde-liberating compound. In this prior specification emphasis is directed to the use of articles which have been considerably extended by cold drawing and the methods of effecting the treatment include those wherein the articles are soaked in an aqueous solution of formaldehyde, removed and subsequently baked at 100–150° C. for a short time; it is said that the pH of the solution should not go below 3.0 and that catalysts of a weakly acidic or basic nature may be used.

The object of this invention is to modify the properties of articles of the kind described, but which have not been cold drawn, so that they are no longer capable of being cold drawn by more than about 75% of their original lengths.

This object is achieved according to the present invention by a process which comprises impregnating filaments, bristles, yarns and like shaped articles derived from synthetic linear polyamides with an aqueous solution having a pH not greater than 3.0 and having dissolved therein not less than 20% by weight of formaldehyde as well as a catalyst as hereinafter defined, preferably removing solution adhering to the surface of the articles, and then baking at 100–150° C.

The catalysts which may be used for the purposes of this invention are acids with ionization constants of not less than $1.0 \times 10^{-2}$ at 25° C. or water-soluble ammonium, amine or metallic salts of these; they may be used alone, in admixture with one another, or in admixture with salts or acids with lower dissociation constants. It will, of course, be understood that, since the pH of the solution used depends on the nature of the catalyst, the catalyst must be chosen so as to give a solution having a pH of less than 3.0. Suitable catalysts include sulphuric acid, hydrochloric acid, aqueous solutions of sulphur dioxide, sulphamic acid, sulphanilic acid, sodium hydrogen sulphate, potassium hydrogen sulphate, ammonium sulphate, ammonium chloride, ammonium nitrate, ammonium sulphite, ammonium bisulphite, ammonium thiosulphate, ammonium sulphamate, potassium iodide, potassium chloride mixed with boric acid, calcium chloride, hydroxylamine hydrochloride, aniline hydrochloride, aluminium sulphate and aluminium sulphate mixed with potassium chloride. Suitable proportions of these acids or salts are from about 0.5% to 5% based on the weight of the solution, but greater amounts may be used if desired.

In carrying the invention into practical effect a bath containing the catalyst and the formaldehyde is prepared, and the articles to be treated are immersed therein for from several minutes to many hours at temperatures up to that of the boiling point of the bath. Immersions for 5–15 minutes at 55° C. or for 1 or more hours at room temperature are convenient. If desired, additional ingredients may be incorporated in the bath; these include wetting, dispersing or swelling agents. Alternatively, such agents may be used in pre-treating baths.

After the articles are taken out of the bath, surface liquid adhering to the articles is advantageously removed, since it has been found that this reduces the risk of tendering during the subsequent baking. The greater proportion of the adherent liquid may be removed by mechanical means as by wiping, squeezing or centrifuging, and the articles may then be dried completely as by heating in air at a moderately elevated temperature, for example 30-40° C.

The baking may be carried out in accordance with conventional practice. Baking at 100-150° C., preferably at about 140° C. is suitable. Higher temperatures may be used, but, the higher the temperature, the greater the risk of discolouration. The time of baking may be from several minutes to several hours.

The extensibility and breaking load of the treated articles is conveniently measured with a Goodbrand single thread testing machine. Comparative measurements of extensibility may also be made by drawing samples to breaking point by hand. These simple tests are useful in determining optimum conditions for carrying out the treatment in accordance with the process of the invention.

The invention is illustrated but not limited by the following examples in which the percentages are percentages by weight:

Example 1

Polyhexamethylene adipamide yarn is immersed for 18 hours at room temperature in a bath consisting of an aqueous solution containing 36% formaldehyde and 0.5% ammonium chloride. The pH of the solution is 1.09. The yarn is taken out of the bath and, after adhering liquid has been removed, dried by heating in air at 40° C. for 3 hours. The dried yarn is then baked in an oven at 142° C. for 15 minutes.

The so treated yarn has a breaking load of 221 gm. and an extension at break of 37% of its original length, as measured on the Goodbrand single thread testing machine.

The untreated yarn has an extension at break of about 300% of its original length.

Example 2

Polyhexamethylene adipamide yarn is immersed for 5 minutes at 55° C. in commercially available Formalin (36% formaldehyde) to which has been added 1% potassium chloride, 2.1% boric acid, and a sufficiency of caustic soda to bring the pH to 3.0. The yarn is taken out of the bath and, after adhering liquid has been removed, dried by heating in air at 40° C. for 3 hours. The dried yarn is then baked in an oven at 142° C. for 15 minutes.

The so treated yarn, after scouring with water, has a breaking load of 244 gm. and an extension at break of 62.5% as measured on the Goodbrand single thread testing machine.

The yarn used in the above examples is an S twist filament yarn of 174 denier.

Example 3

Samples of undrawn polyhexamethylene adipamide yarn are treated with aqueous solutions containing formaldehyde (36%) and various catalysts, drained, dried and baked in the manner described in Example 1. The effect of the treatment on the drawing properties of the samples of yarn is shown in the accompanying table, which gives figures for their extensibilities after treatment as determined by drawing them to breaking point by hand.

The untreated yarn has an extension at break of about 300%.

| Catalyst used | Concentration of catalyst | pH of Solution | Extensibility |
|---|---|---|---|
|  | Per cent |  | Per cent |
| Sulphuric acid | 1 | 0.88 | 66 |
| Sulphur dioxide | 0.5 | 1.2 | 50 |
| Hydrochloric acid | 1 |  | 50 |
| Sodium hydrogen sulphate | 1 | 1.3 | 33 |
| Ammonium hydrogen sulphate | 1 | 1.12 | 50 |
| Sodium sulphamate | 1 | 1.92 | 50 |
| Hydroxylamine hydrochloride | 1 | 1.0 | 50 |
| Aniline hydrochloride | 1 |  | 58 |
| Oxalic acid | 0.5 | 1.5 | 70 |
| Trichloracetic acid | 5.0 | 0.5 | 16.6 |

The yarns treated in this way have an increased heat stability, softening point, receptivity to dyestuffs and resistance to fatigue, and they are less soluble in organic liquids which dissolve the untreated polyamide.

We claim:

1. A process for modifying the properties of synthetic linear polyamide articles in the form of filaments, bristles, yarn or the like which have not been cold drawn to render said article incapable of being cold drawn by more than about 75% of their original length, said process comprising impregnating the shaped undrawn polyamide article in the form of filaments, bristles, yarns and the like with an aqueous solution having a pH of not greater than 3.0 and having dissolved therein at least 20% by weight of formaldehyde, a catalyst selected from the group consisting of acids having an ionization constant of at least $1.0 \times 10^{-2}$ at 25° C., and the water soluble ammonium, amine and metallic salts of such acids, removing the surface liquid adhering to the article to prevent tendering on subsequent baking, and then baking the impregnated article at a temperature of 100° to 150° C.

2. The process set forth in claim 1 in which said catalyst is present in said solution in amount based on the weight thereof of from 0.5 to 5%.

3. The process set forth in claim 1 in which the impregnated article is baked at a temperature of about 140° C.

4. A synthetic linear undrawn polyamide article in the form of a filament, bristle, yarn or the like, which is incapable of being cold drawn by more than about 75% of their original length and which is obtained by the process set forth in claim 1.

DAVID McCREATH.

REFERENCES CITED

The following references are of record in the file of this patent:

UNITED STATES PATENTS

| Number | Name | Date |
|---|---|---|
| 2,177,637 | Coffman | Oct. 31, 1939 |
| 2,275,008 | Coffman | Mar. 3, 1942 |